United States Patent [19]

Richardson

[11] Patent Number: 5,858,210
[45] Date of Patent: Jan. 12, 1999

[54] METHOD FOR REGULATING PARTICLE TRANSFER RATES

[75] Inventor: Larry D. Richardson, Lakewood, Ill.

[73] Assignee: UOP LLC, Des Plaines, Ill.

[21] Appl. No.: 852,478

[22] Filed: May 7, 1997

Related U.S. Application Data

[60] Provisional application No. 60/017,951, May 20, 1996.

[51] Int. Cl.⁶ .................................................. C10G 35/10
[52] U.S. Cl. .......................... 208/173; 208/174; 208/175; 208/176
[58] Field of Search .................................... 208/173, 174, 208/164, 176, 175

[56] References Cited

U.S. PATENT DOCUMENTS

| | | | |
|---|---|---|---|
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 4,576,712 | 3/1986 | Greenwood | 208/138 |
| 4,872,969 | 10/1989 | Sechrist | 208/173 |
| 5,338,440 | 8/1994 | Sechrist et al. | 208/173 |
| 5,500,110 | 3/1996 | Sechrist et al. | 208/173 |

*Primary Examiner*—Helane Myers
*Attorney, Agent, or Firm*—Thomas K. McBride; John G. Tolomei; Michael A. Moore

[57] ABSTRACT

A controlled method of changing the transport rate of particles between a source zone and a destination zone is disclosed. Changes are made in a desired value of the pressure difference of the conduit between the two zones through which the particles are transported. The changes are of a magnitude that are determined by the batchwise transfer of particles into the source zone and are performed at a rate that is determined by the dynamics of the process, rather than by the frequency of the batchwise transfers, until the desired final value of the pressure difference is reached. The method minimizes fluctuations in the pressures of the two zones without over-sized vessels or additional equipment that would otherwise be needed to accommodate pressure changes. This results in a savings in construction costs. This invention is adaptable to a multitude of processes for the catalytic conversion of hydrocarbons in which deactivated catalyst particles are regenerated.

10 Claims, 3 Drawing Sheets

METHOD FOR REGULATING PARTICLE TRANSFER RATES

CROSS-REFERENCE TO RELATED APPLICATION

This application claims the benefit of U.S. Provisional Application No. 60/017,951, filed on May 20, 1996.

FIELD OF THE INVENTION

The broad field of the present invention is the handling and transport of particles. More specifically, the field of the present invention is the control of changing the rate of transporting particles.

BACKGROUND OF THE INVENTION

Catalytic processes for the conversion of hydrocarbons are well known and extensively used. In many of these processes, the catalyst consists of particles that are transported between two or more catalyst-containing vessels. The reason why the catalyst is transported varies depending on the process. For example, the catalyst may be transported from one reaction vessel into another reaction vessel in order to take advantage of different reaction conditions in the two vessels in order to improve product yields. In another example, the catalyst may first be transported from a reaction vessel into a regeneration vessel in order to rejuvenate the catalyst, and after rejuvenation, the catalyst may be transported back to the reaction vessel.

The vessels between which the catalyst is transported are not necessarily adjacent, and indeed it is common that the outlet of the source vessel, that is the vessel from which the catalyst is transported, may be a significant distance horizontally and vertically from the inlet of the destination vessel, that is the vessel to which the catalyst is transported. An inexpensive and common method of transferring catalyst over significant vertical and horizontal distances is by pneumatic conveying through a conduit. Pneumatic conveying is well known to those skilled in the art of transporting particles. Pneumatic conveying is described at pages 5–46 to 5–48 in *Perry's Chemical Engineers' Handbook*, Sixth Edition, ed. by Don W. Green, McGraw-Hill ed., McGraw-Hill Book Company, New York, 1984.

One of the characteristics of pneumatic conveying is that because of the pressure difference across the conduit between the source and destination vessels, the destination vessel must operate at a pressure that is lower than that of the source vessel. In many catalytic processes, however, for process reasons the destination vessel operates at a higher pressure than that of the source vessel. In such processes, therefore, pneumatic conveying by itself is not sufficient to transfer catalyst from the source vessel to the destination vessel, and a supplemental method that is capable of transferring catalyst from low pressure to high pressure must be used. A common and inexpensive method of transferring catalyst through a significant increase in pressure is by lock hopper. Lock hoppers are well known to those skilled in the art of transporting particles. The use of lock hoppers in combination with pneumatic conveying in a two-step method is also well known. First, a lock hopper transfers catalyst from the low pressure source vessel to a pneumatic conveying system that is at a higher pressure than that of the destination vessel. Second, the pneumatic conveying system transfers the catalyst to the destination zone, which is at a higher pressure than that of the source vessel, in spite of the pressure drop associated with pneumatic conveying.

One of the problems associated with combining a lock hopper and a pneumatic conveying system is that the lock hopper and the pneumatic conveying system can and often do transfer catalyst independently and at different rates. For example, typically a lock hopper transfers catalyst in batches whereas a pneumatic conveying system transfers catalyst continuously. Accordingly, a surge zone is necessary between the lock hopper and the pneumatic conveying system in order to maintain a volume of catalyst to balance the transitory differences in the flow that may occur during intermittent transport of catalyst from the source vessel to the destination vessel. The level of catalyst in the surge zone has been used in a method of controlling the rate of pneumatic conveyance of the catalyst through a conduit to the destination vessel. Typically, this method comprises providing a controller with a desired value of the level of catalyst in the surge zone, measuring with a device the actual value of the level, comparing the desired and actual values, and finally changing the rate of conveyance until the actual and desired values of the level are substantially equal.

Control methods like the ones just described suffer from large and rapid fluctuations in the pressures in the lock hopper, the surge zone, the destination vessel, or all three. If the catalyst enters the surge zone intermittently and in relatively large batches at the same time that catalyst is transported from the surge zone through a pneumatic conduit continuously, the level in the surge zone undergoes a large and rapid change each time a batch of catalyst is added to the surge zone. As a result of the action of the surge zone level controller, such changes from one value of the actual level to another value of the actual level produce large and rapid changes in the transport rate. This, in turn causes large and rapid pressure fluctuations, because in pneumatic conveying the pressure difference across the conduit between the source and destination vessels varies depending on the transport rate of catalyst through the conduit. For example, the pressure difference across the conduit when gas is flowing at its design rate and no catalyst is flowing may be only 1–5 in. $H_2O$, but the pressure difference when gas and catalyst are both flowing at their design rates may be 150–250 in. $H_2O$. In those processes where catalyst is entering the surge zone by gravity flow at the same time that catalyst is being transported out of the surge zone through the conduit, a surge of 150–250 in. $H_2O$ in the pressure of the surge zone can make part or all of the catalyst transport system unstable. Because this situation is unacceptable, use of larger and/or extra vessels and higher rates for making up and venting gases from the process in order to attempt to control the pressure fluctuations have been employed. Because these corrective measures are expensive, methods are thus sought for interrelating or integrating the transfer rates of the lock hopper with that of the pneumatic conveying system.

INFORMATION DISCLOSURE

U.S. Pat. No. 3,652,231 (Greenwood et al.) describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with regeneration of reforming catalyst. The teachings of patents '231, '680, and '496) are hereby incorporated by reference in full into this patent application.

U.S. Pat. No. 5,338,440 discloses a method of using a surge zone, a blower, and two regulating valves to control the pressure fluctuations between two zones during catalyst transport.

U.S. Pat. No. 5,500,110 discloses a method of changing the transport rate of particles between two zones by making changes in a computed value of the pressure difference between the two zones.

U.S. Pat. Nos. 4,576,712 and 4,872,969 disclose methods of transporting particles from a low pressure zone to a high pressure zone by means of a valveless lock hopper.

BRIEF SUMMARY OF THE INVENTION

This invention is a method of controlling the transport rate of particles from a source vessel to a destination vessel by using a transport rate computed from the frequency of batchwise transfer of particles into the source vessel to regulate the transport rate of particles from the source vessel to the destination vessel. Although the transport rate computed from the transfer of the particles into the source zone is necessarily intermittent because of the nature of batchwise transfer, this method is nevertheless capable of regulating and changing the transport rate of particles from the source vessel to the destination vessel during the time period between batch transfers into the source zone.

Unlike the prior art processes where the rate of withdrawal of particles from the source zone varies wildly because it is controlled in response to the frequently changing level of particles in the source zone with each batchwise addition of particles, the rate of withdrawal from the source zone in this invention is gradually increased or decreased in response to the average rate of particle addition to the source zone. This invention allows the rate of withdrawal of particles from the source zone to be increased or decreased at the maximum rate that is determined by the operational dynamics of the process. Accordingly, a broad objective of this invention is to provide an improved method of changing the rate of transfer of particles in a process that transfers particles in a batchwise manner. A more specific objective is to provide a method of changing the rate of transfer of particles in a batchwise process at a rate of change that is at the maximum rate that is permitted by the process without upsetting the process or otherwise making the process unstable.

In a broad embodiment, this invention is a method for controlling the transport rate of particles from a source zone to a destination zone at a rate that does not exceed a maximum change rate for a particle transport system. Particles are withdrawn from a source zone and passed through a line to a destination zone at a transport rate of the particles. An actual value of an indicator that varies in relation to the transport rate of the particles from the source zone to the destination zone is measured. By the withdrawal of the particles from the source zone, the actual volume of the particles in the source zone is allowed to decrease below a control volume of the particles in the source zone. When the actual volume of the particles in the source zone is below the control volume, particles are added to the source zone. This addition of particles increases the actual volume of the particles in the source zone to more than the control volume. After the particles are added to the source zone, the actual volume of the particles in the source zone is again allowed to decrease below the control volume as a result of the withdrawal of the particles from the source zone. A first average value of the indicator is determined for a first time period that extends from the time when the actual volume of the particles in the source zone decreased below the control volume of the particles in the source zone for the first time until the time when the actual volume of the particles in the source zone decreased below the control volume of the particles in the source zone for the second time. A first average addition rate of the particles to the source zone during the first time period is determined by dividing the amount of particles added to the source zone by the first time period. A first final value of the indicator is established as a function of a target addition rate of the particles, the first average addition rate of the particles, and the first average value of the indicator. The desired value of the indicator is increased or decreased at a change rate that does not exceed the maximum change rate of the indicator. The desired value of the indicator after the increasing or decreasing is compared with the actual value of the indicator. A control signal is updated in response to the difference between the desired value after the increasing or decreasing and the actual value, thereby generating an updated control signal. The updated control signal is employed to actuate a means to control the transport rate of the particles from the source zone to the destination zone. The steps of increasing or decreasing the desired value of the indicator, comparing the desired and actual values of the indicator, updating the control signal, and employing the control signal to actuate a means to control the transport rate are repeated until the desired value equals the first final value of the indicator.

In a more detailed embodiment, this invention is a hydrocarbon conversion process for contacting a hydrocarbon-containing feedstream with a particulate catalyst at hydrocarbon conversion conditions in a reaction zone. The catalyst in the reaction zone is deactivated. The catalyst is passed from a first bottom location in the reaction zone to a first top location in a regeneration zone. The catalyst is reactivated in the regeneration zone. The catalyst is passed from a second bottom location in the regeneration zone to a second top location in the reaction zone. The transport rate of the catalyst from the second bottom location to the second top location is controlled at a rate that does not exceed a maximum change rate for the hydrocarbon conversion process. The catalyst is passed downwardly from the second bottom location to a surge zone. The catalyst is passed downwardly from the surge zone to a fluid-controlled valve. The flow of a fluid to the fluid-controlled valve is regulated to deliver the catalyst to a lift conduit. The catalyst is conveyed upwardly through the lift conduit with the fluid and the catalyst is discharged to the second top location at a transport rate of the catalyst. An actual value of the pressure difference across at least a portion of the lift conduit is measured. By the passing of the catalyst from the surge zone, the actual volume of the catalyst in the surge zone is allowed to decrease below a control volume of the catalyst in the surge zone. When the actual volume of the catalyst in the surge zone is below the control volume, catalyst is added to the surge zone. The addition of catalyst to the surge zone increases the actual volume of the catalyst in the surge zone to more than the control volume. After adding the catalyst to the surge zone, the actual volume of the catalyst in the surge zone is again allowed to decrease below the control volume as a result of the passing of the catalyst from the surge zone. A first average value of the pressure difference is determined during a first time period that extends from the time when the actual volume of the catalyst in the surge zone decreased below the control volume of the catalyst in the surge zone for the first time until the time when the actual volume of the catalyst in the surge zone decreased below the control volume of the catalyst in the surge zone for the second time. A first average addition rate of the catalyst to the surge zone during the first time period is determined by dividing the amount of catalyst added to the surge zone by the first time period. A first final value of the pressure difference is established as a function of a target addition rate of the catalyst, the first average addition rate of the catalyst, and the first average value of the pressure difference. The desired value of the pressure difference is increased or decreased at a change rate that does not exceed 20 percent of the maximum value of the pressure difference per minute. The desired value of the pressure difference after being increased or decreased is compared with the actual value of the pressure difference. A control signal is updated in response to the difference between the desired value after the increasing or decreasing and the actual value, thereby generating an updated control signal. The updated control signal is employed to actuate a valve operably located so as to control the flow of the transport stream to the fluid-controlled valve. The steps of increasing or decreasing the desired value of the pressure difference, comparing the desired and actual values of the pressure difference, updating the control signal, and employing the control signal to actuate a valve operably located to control the flow of the transport stream to the fluid-controlled valve are repeated until the desired value equals the first final value of the pressure difference.

Other objects, embodiments, and details of the present invention are presented in the following detailed description of the invention.

DETAILED DESCRIPTION OF THE INVENTION

Figure 1A:
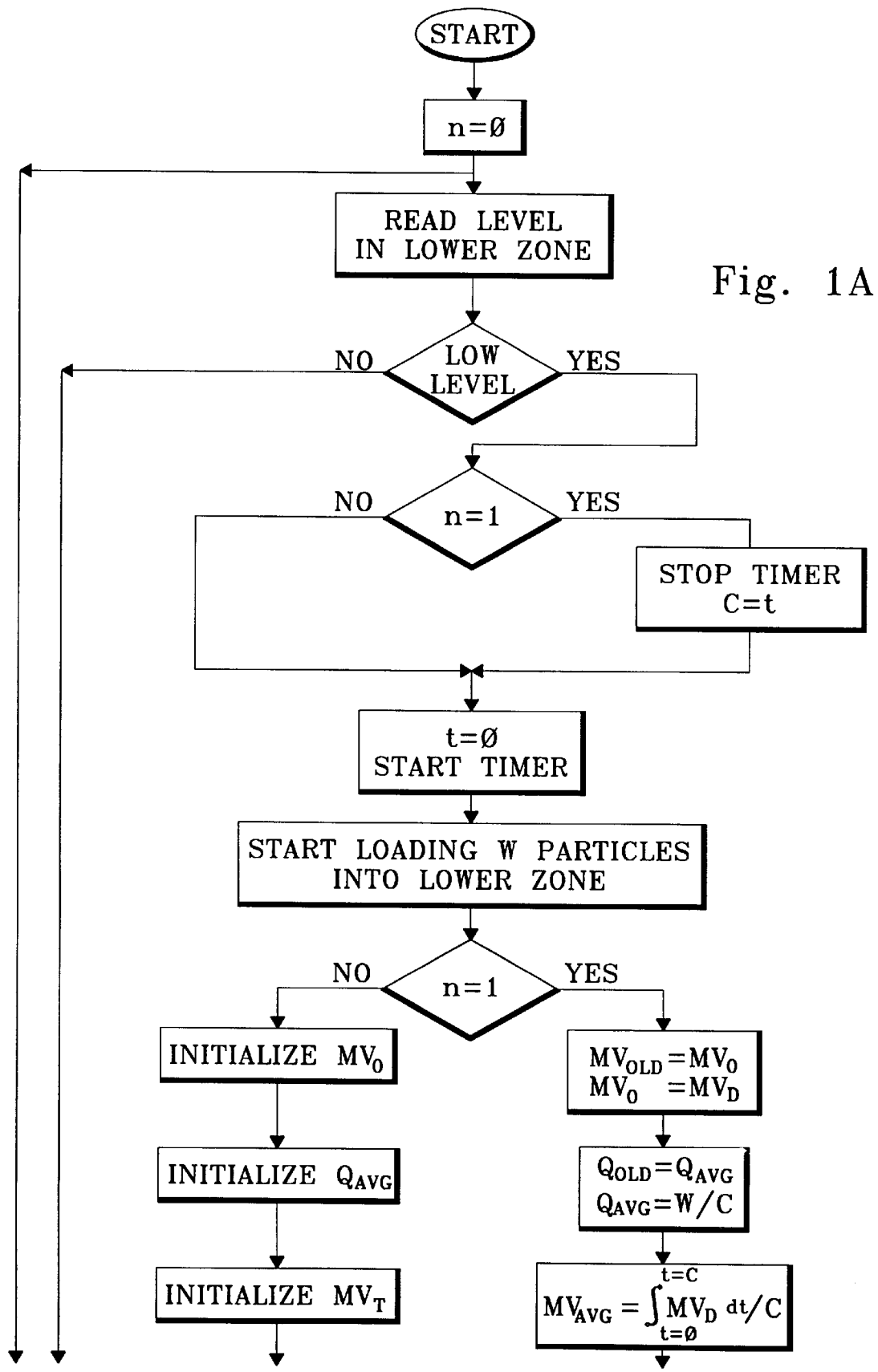
FIGS. 1A and 1B are a flow sheet that illustrates the logic steps of an embodiment of the present invention.

The present invention can be applied to any system wherein particles require transport by pneumatic conveying in a manner that will reduce the fluctuations in the pressures of the vessels between which the particles are conveyed. Particles suitable for use in this invention will normally comprise geometric shapes of regular size. The maximum dimension of the particles will be substantially less than the conduits used for conveyance and transport of the particles. In most cases, the particles will have a maximum dimension of less than ½ inch. The most preferred type of particles is catalyst particles in use in hydrocarbon conversion processes. This invention, as applied to petroleum refining, may be employed in a wide variety of hydrocarbon conversion reactions including catalytic reforming, fixed-bed alkylation, hydrorefining, hydrocracking, dehydrogenation, hydrogenation, steam reforming, etc.

The most widely practiced hydrocarbon conversion process to which the present invention is applicable is catalytic reforming. Therefore the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about 1/16th to about 1/8th inch (1.5–3.1 mm), though they may be as large as ¼th inch (6.35 mm). In a particular reaction-regeneration system, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and regeneration zone. The present invention is applicable to either a moving bed regeneration zone or a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step regeneration process is used to remove the coke deposits and recondition the catalyst to restore its full reaction promoting ability. The art of moving bed regeneration zones is well known and does not require detailed description herein. Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it may be semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The majority of the description of the present invention is presented in terms of transferring catalyst particles from a regeneration zone containing oxygen to a reaction zone containing hydrocarbon using hydrogen as a conveying or lift fluid. However, this description is not intended to limit the scope of the invention as set forth in the claims to this particular arrangement.

Figure 2:
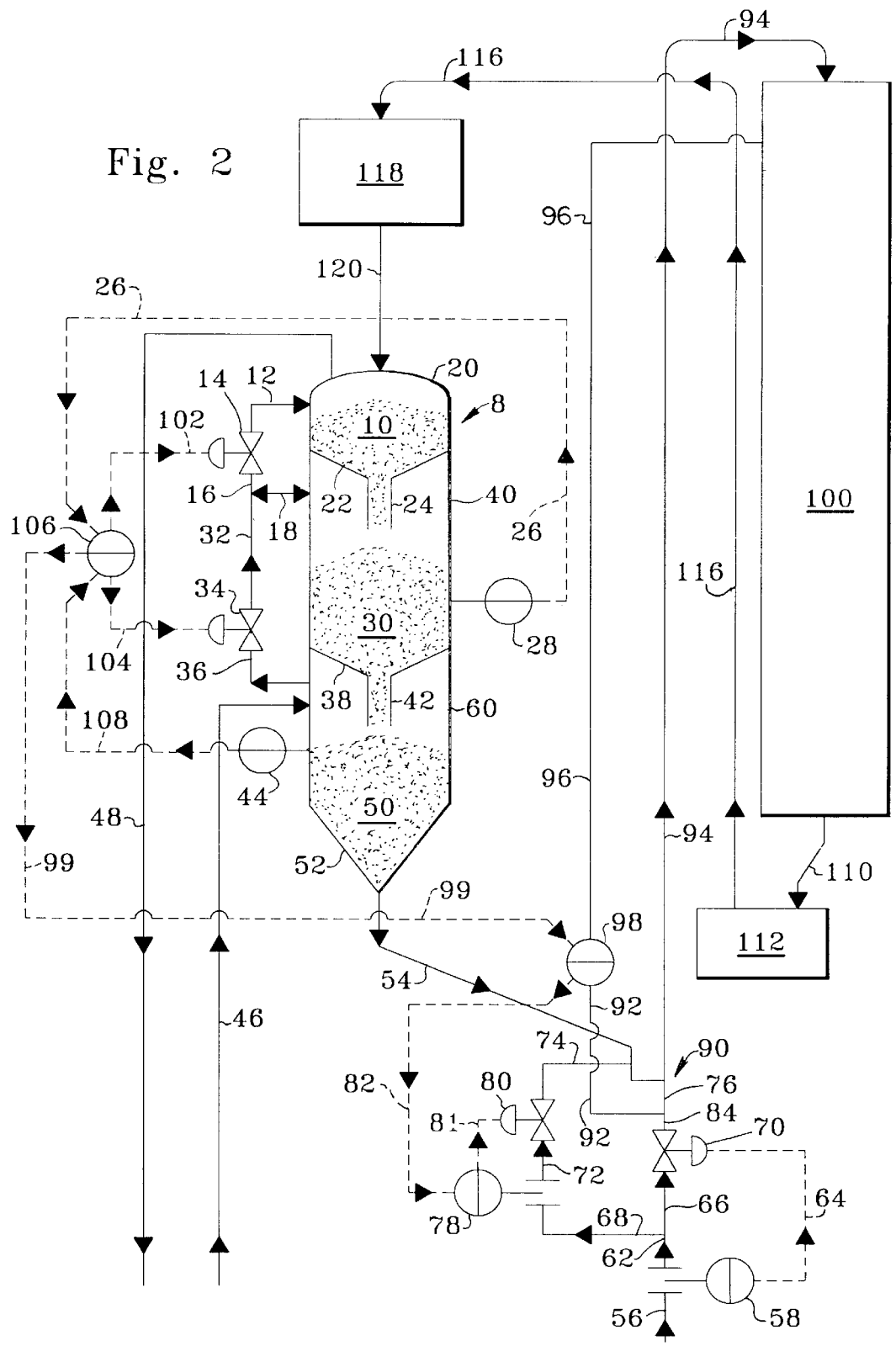
FIG. 2 is a schematic flow diagram of a reforming process which illustrates an application of the present invention.

FIG. 2 illustrates a reactor and regenerator system for a reforming reaction zone with a catalyst particle transport system that uses the method of this invention to control the transport rate of catalyst. FIG. 2 shows only those parts of the reactor and regenerator system that are necessary for an understanding of this invention. Starting then with the movement of regenerated catalyst, a line 54 supplies catalyst particles to a nonmechanical valve 90. Catalyst flows in dense phase transport through line 54. A lift fluid that is used both to regulate the transport of particles and to lift the particles enters the process through a line 56. A flow controller 58 measures the total flow of lift fluid in the line 56. The flow controller 58 typically comprises a metering orifice, a flow rate measuring instrument that measures the flow rate through the metering orifice, and a means for generating a control signal 64 in response to the difference between the actual flow rate and a desired flow rate.

The lift fluid flows through a line 62 and is divided into two portions, a regulating portion that flows through a line 68 and the remainder of the lift fluid that flows through a line 66. The regulating portion flows through a flow controller 78, which measures and controls the flow rate of the regulating portion by measuring the flow rate through a metering orifice in a manner that is similar to flow controller 58. The flow controller 78 generates a control signal 81 in response to the difference between the actual flow rate and a desired flow rate. In the embodiment that is shown in FIG. 2, the signal for the desired flow rate to flow controller 78 is provided by a signal 82 from differential pressure controller 98. The regulating portion flows through a line 72, through a regulating valve 80, through line 74, and into valve 90. The opening of regulating valve 80 is regulated by the control signal 81. The regulating portion that enters nonmechanical valve 90 through line 74 regulates the transfer of catalyst particles through the nonmechanical valve 90 into a lift line 94. Nonmechanical valves can take on forms such as L valves, J valves, and K valves. Nonmechanical valves are well known, and further information on the operation of such valves can be found in an article titled "L Valves Characterized for Solid Flow" beginning at page 149 in the March, 1978 issue of Hydrocarbon Processing, in the text entitled "Gas Fluidization Technology," edited by D. Geldart and published by John Wiley & Sons in 1986, and in U.S. Pat. No. 4,202,673. The teachings of these references regarding nonmechanical valves are incorporated herein by reference.

The remainder of the lift fluid flows through the line 66 and a regulating valve 70, the opening of which is regulated by the control signal 64 from the flow controller 58. The remainder of the lift fluid flows through lines 84 and 76 and enters the bottom of the lift line 94. The regulating portion which flows through nonmechanical valve 90 and the remainder of the lift fluid which does not flow through nonmechanical valve 90 recombine at the junction of line 76 and lift line 94 so that the total lift fluid transports the catalyst particles upwardly through lift line 94. Catalyst particles are transported up the lift line 94 in a transport mode where the flow of lift fluid is sufficient to lift the particles upwardly through the lift line 94. The lift fluid is usually added in sufficient amounts to create a superficial gas velocity through the lift line of at least 10 feet per second and more typically 25 to 30 feet per second. Over most of its length, the lift line 94 extends in a substantially vertical direction. By substantially vertical in this context it is meant that the lift line 94 will vary from the vertical by no more than 10° and preferably no more than 5°. At the top of the substantially vertical length, the lift line 94 extends in either a substantially horizontal or a downwardly sloping direction to a location above the stacked reactor arrangement 100, and from there it extends in a substantially vertical direction to the top of the stacked reactor arrangement 100, which the particles and lift fluid enter. By substantially horizontal in this context it is meant that the line will vary from the horizontal by no more than 10° and preferably no more than 5°. By downwardly sloping in this context, it is meant that the line will vary from the horizontal by between 10° and 30°. This angle is set as the angle necessary for the catalyst particles to just maintain steady state movement through the line, and it has been found that a 20° angle is preferred.

Catalyst flows through the stacked reactor arrangement 100 from top to bottom. A device 98 measures the pressure difference across the lift line 94 by means of an impulse tap 92 to the junction of lines 84 and 76 and another impulse tap 96 to the top of stacked reactor arrangement 100. The catalyst particles and the lift fluid in lift line 94 discharge into the stacked reactor arrangement 100. The stacked reactor arrangement 100 may comprise, in addition to multiple stages of reaction, several other zones. For example, a disengaging zone may be used to disengage the catalyst particles from the lift fluid, and a reduction zone may be used to at least partially reduce the catalytic metal on the catalyst particles. After reduction, the catalyst particles flow through multiple stages of reaction in which process fluids contact the catalyst particles. Details of the contacting beds and other internals of the stacked reactor arrangement 100 are well known to those skilled in the art and permit continuous or intermittent flow of the catalyst particles from the top to the bottom of the stacked reactor arrangement 100.

Catalyst particles flow from the bottom of the stacked reactor arrangement 100 in dense phase transport through a lower line 110. Lower line 110 also displaces hydrogen and hydrocarbons from the catalyst particles to prevent any carryover of hydrogen and hydrocarbon into the regenerator side of the process. At the bottom of lower line 110 a lifting zone 112 fluidizes the catalyst particles and transports the particles upwardly through a lift line 116. Although not shown in FIG. 2, lifting zone 112 typically comprises a non mechanical valve and regulating valves, and thus operates in a manner similar to that described for nonmechanical valve 90 and regulating valves 70 and 80.

Catalyst particles travel upwardly through lift line 116 in a manner similar to that described for lift line 94 into regeneration zone 118. The regeneration zone 118 typically comprises a disengaging hopper, a regeneration vessel, and a nitrogen seal drum, which are not shown in FIG. 2. The disengaging hopper typically disengages the catalyst particles from the lift fluid and also maintains a volume of catalyst to balance the transitory differences in the flow that may occur during intermittent transport of catalyst through the stacked reactor arrangement 110 and the regenerator vessel. In the regeneration vessel, one or more catalyst regeneration steps take place, such as coke removal, oxidation and redispersion of the catalytic metal, and drying. The nitrogen seal drum displaces oxygen gas from the regenerated catalyst with nitrogen in order to prevent any carryover of oxygen to the stacked reactor arrangement 100. Preferably, the disengaging hopper, the regeneration vessel and the seal drum are arranged so that the catalyst can flow continuously or intermittently from the top of the disengaging hopper to the bottom of the seal drum by means of gravity. Disengaging hopper, regeneration vessel, and seal drum arrangements are well known to those skilled in the art and may be used in any of their current well known forms to supply a flow of regenerated catalyst through a line 120.

The regenerated catalyst passes through the line 120 into a valveless lock hopper system 8. The valveless lock hopper system 8 is a method of transferring particles from a low pressure zone to a high pressure zone. Details of the valveless lock hopper system are described in U.S. Pat. No. 4,576,712, the teachings of which are incorporated herein by reference. Lock hopper system 8 controls the transfer of catalyst from the regeneration zone 118, which operates at a relatively low pressure, to the nonmechanical valve 90 and the stacked reactor arrangement 100, which operate at a relatively high pressure. Catalyst particles from line 120 accumulate in a bed 10 in an upper zone 20 of lock hopper system 8. The catalyst particles are transferred to a lower zone 60, where a bed 50 serves as a retention volume or surge volume for feeding catalyst particles to the nonmechanical valve 90. Lower zone 60 is typically at a higher pressure than upper zone 20. For example, the upper zone 20 could be maintained at a nominal pressure of 35 psi(g) (241 kPa(g)) and permitted to vary within a range of from 30 to 40 psi(g) (207 to 276 kPa(g)), while the nominal pressure of the lower zone 60 could be 55 psi(g) (379 kPa(g)) with a range of from 50 to 60 psi(g) (345 to 414 kPa(g)). Thus, the differential pressure between the upper zone 20 and the lower zone 60 could range from 10 to 30 psi(g) (69 to 207 kPa(g)). However, the differential pressure between the two zones could be much greater or much less.

Middle zone 40 is used to effect the transfer of catalyst particles from upper zone 20 to lower zone 60. Catalyst particles pass from upper zone 20 to middle zone 40 through an upper conduit 24, which extends from a frustro-conical section 22 at the bottom of upper zone 20 to project into the middle zone 40. The extension of upper conduit 24 into lock hopper zone 40 provides a means for fixing the high level of catalyst particles in the middle zone 40. Catalyst particles pass from the middle zone 40 to the lower zone 60 through a lower conduit 42, which extends from a frustro-conical section 38 at the bottom of middle zone 40 into lower zone 60.

Gas enters lower zone 60 through a line 46. Means (not shown) may be used to regulate the gas flowing into the lower zone 60 in order to independently control the pressure of the lower zone 60. Gas exits upper zone 20 through a line 48. The pressure of upper zone 20 is independently controlled by means not shown. For example, upper zone 20 may be connected through the line 48 to another vessel, so that the pressure of the upper zone 20 depends upon and varies with the pressure in that vessel.

Gas may flow from the lower zone 60 to upper zone 20 by one of two alternate paths, where the middle zone 40 is a part of each path. One gas flow path comprises lower conduit 42, middle zone 40, line 18, line 16, upper valve 14, and line 12. This flow path is available for gas flow when upper valve 14 is open and lower valve 34 is closed. The other flow path comprises line 36, valve 34, line 32, line 18, middle zone 40, and upper conduit 24. This flow path is available for gas flow when upper valve 14 is closed and lower valve 34 is open. Baffles or other means for gas distribution or for gas collection, which are not shown, may be used where appropriate at each of the points of connection of the gas lines 46, 36, 18, 12, and 48 to the lock hopper system 8.

Level switch 28 is provided in the middle zone 40 in order to sense when the level of catalyst particles in a bed 30 in the middle zone 40 is at a previously determined control level and to transmit a signal 26 to a controller 106. Level switch 44 is provided in the lower zone 60 in order to sense when the level of catalyst particles in the lower zone 60 is at a previously determined control level and transmit a signal 108 to the controller 106. The particular locations or elevations of the control levels for level switches 28 and 44 are not an essential element of this invention and are determined by factors including the size of the lock hopper system 8. Accordingly, the scope of this invention as set forth in the claims includes the cases where the control switches 28 and 44 generate their respective signals 26 and 108 when the catalyst particles are at or below their respective control levels. Signal 108 generates or causes to be generated a lock hopper cycle initiation signal whenever the level of catalyst particles in lower zone 60 is at the previously determined low level of level switch 44. The cycle initiation signal causes valves 14 and 34 to move to the start of a particle transfer cycle, as will be explained below. The controller 106 adjusts the positions of the valves 14 and 34, which are two-position, open-closed valves. Controller 106 also includes a timer (not shown) which times the time period between two successive generations of the cycle initiation signal 108.

Transfer of catalyst particles from upper zone 20 to lower zone 60 may be accomplished with a five-step cycle. A single cycle results in the transfer of one batch of particles from the upper zone 20 to the lower zone 60.

Step 1 of the cycle is the hold or ready step. In step 1 of the cycle, the middle zone 40 is filled to its maximum capacity with catalyst particles. There is an inventory of catalyst particles in the upper zone 20. Upper and lower conduits 24 and 42 are filled with catalyst. The inventory in upper zone 20 is replenished with catalyst from the regeneration zone 118. Catalyst particles are present in lower zone 60. Valve 14 is open and valve 34 is closed. During step 1, gas passes from lower zone 60 to middle zone 40 through lower conduit 42. Downward flow of particles from middle zone 40 to lower zone 60 is prevented at this time by the upward flow of gas through lower conduit 42. Flow of catalyst from upper zone 20 to middle zone 40 does not occur at this time by virtue of the fact that the level of particles in middle zone 20 is at the lower end region of upper conduit 24.

In step 2, which may be denoted the pressurization step, valve 14 is closed and valve 34 is opened. This equalizes the pressure between the middle zone 40 and the lower zone 60; thus the internal pressure of the middle zone 40 increases in this step to a pressure greater than the internal pressure of the upper zone 20. Upon completion of pressurization of the middle zone 40, step 3 is begun.

Step 3 is the unload step, where catalyst particles are unloaded from the middle zone 40 to the lower zone 60. Flow of catalyst particles from the upper zone 20 to the middle zone 40 is prevented by flow of gas upward through upper conduit 24. The level of catalyst particles in the middle zone 40 falls as catalyst particles flow out of conduit 42 to the lower zone 60. During this time, the gas entering via line 46 flows through valve 34 and into the middle zone 40. The pressures of the lower zone 60 and the middle zone 40 are substantially the same at this time, although a small pressure difference exists.

Step 4, depressurization, begins when the level in the middle zone 40 falls to a previously determined control point. Level switch 28 detects the absence of catalyst particles at the low point as soon as the level of catalyst particles falls to that low point and immediately transmits a signal 26 to controller 106. Controller 26 causes valve 34 to close and valve 14 to open, thus depressuring the middle zone 40 and changing the gas flow path to the same configuration as in step 1. Step 4 ends when the pressure in the middle zone 40 becomes substantially equal to the pressure of the upper zone 20.

In step 5, catalyst enters the middle zone 40 via upper conduit 24. Step 5 differs from step 1 in that the middle zone 40 is full during step 1 and there is no flow of catalyst particles at all in step 1. During step 5, catalyst flows from upper zone 20 to middle zone 40 until the level rises to the lower end region of upper conduit 24, thus completing the cycle and returning to the hold or ready step, step 1.

This cycle of five steps is normally repeated every time the level of catalyst particles in the lower zone 60 falls to a previously determined control point. Level switch 44 detects the absence of catalyst particles at that low point as soon as the level of catalyst particles falls to that location and immediately transmits a signal 108 to controller 106. Controller 106 sends a signal to initiate a cycle, that is the movement of valves 14 and 34 so that step 2 is entered. Thus the maximum cycle repetition rate depends on the rate of withdrawal of catalyst particles from the lower zone 60. However, the rate also depends on the time for the five steps in the cycle to occur.

Figure 1B:
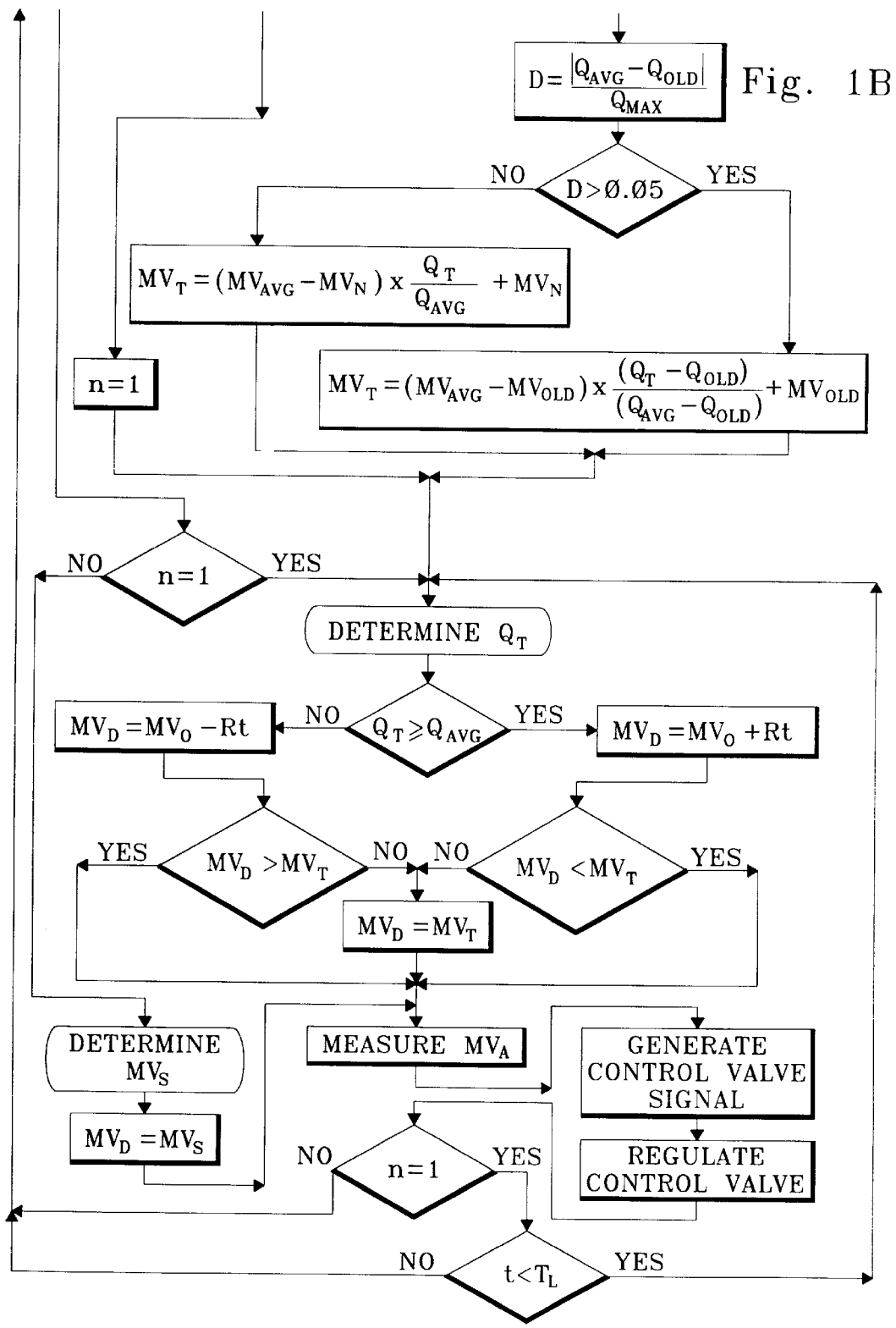

Controller 106 functions as means for receiving level signals 26 and 108 from level switches 28 and 44 respectively, means for controlling the positions of valves 14 and 34 by sending signals 102 and 104 respectively, means for completing the algorithm shown in FIGS. 1A and 1B, and means for sending a differential pressure setpoint signal 99 to differential pressure controller 98. There are many different types of apparatus capable of performing the functions of controller 106, such as process control computers and programmable controllers.

The following description is presented with reference to both FIGS. 1A, 1B, and 2. In the description that follows, the term "manipulated variable," which is symbolized by the symbol "MV," without a subscript, refers to a process variable that varies in response to the transport rate of particles from the outlet of the lower zone 60 to the stacked reactor arrangement 100. For example, MV could refer to the flow rate of the regulating fluid to the nonmechanical valve 90 as measured and regulated by the flow controller 78. MV could also refer to the differential pressure across the lift line 94 as measured and regulated by the differential pressure controller 98. In the description that follows, MV refers to the differential pressure across the lift line 94.

In the description that follows, the symbol "MV" followed by a subscript has a number of meanings, depending on the subscript. The symbol "$MV_D$" refers to the desired value of MV at any given time. Thus, in the case where a differential pressure controller regulates and controls MV, $MV_D$ is the setpoint of that controller. The symbol "$MV_S$" refers to a particular $MV_D$ that, if necessary, is selected usually by a human operator as the desired value of MV during several preliminary steps at the start of the method. The symbol "$MV_O$" refers to a particular $MV_D$ that is the desired value of MV at the start or outset of the current time period during which the value of $MV_D$ is increased or decreased. The symbol "$MV_T$" refers to a particular value of $MV_D$ that is desired at the end or termination of the current time period during which the value of $MV_D$ is increased or decreased. The symbol "$MV_{OLD}$" refers to a particular $MV_D$ that was the desired value at the start or outset of the time period prior to the current time period. The symbol "$MV_{AVG}$" refers to an average value of $MV_D$ during the time period prior to the current time period. In this context, the term "average" means any suitable value that is representative of the value or values which $MV_D$ had during the prior time period. Thus, the term "average" may include, but is not limited to, an arithmetic mean, an arithmetic median, or an arithmetic average of some or all of the values which $MV_D$ had during the time period prior to the current time period. Each value that $MV_D$ had during the prior time period may be weighted in any suitable manner to account for the duration during the prior time period that $MV_D$ had that value. A preferred method of computing $MV_{AVG}$ is integration of $MV_D$ over the prior time period and dividing by total duration of the prior time period, such as:

$$MV_{AVG} = \left[ \int_{t=0}^{t=C} MV_D dt \right] / C$$

where C is the total duration of the prior time period. The symbol "$MV_N$" refers to the actual value of MV when there is no flow rate of catalyst particles through the line from the source zone to the destination zone. The symbol "$MV_{MAX}$" refers to the maximum or design value of MV for the catalyst transport system.

In the description that follows, the symbol "Q" without a subscript refers to the flow rate of catalyst particles into the lower zone 60. Even though the movement of catalyst particles into the lower zone 60 may be referred to as continuous and may in fact be continuous, in practice the movement of catalyst particles may be semicontinuous. By semicontinuous movement is meant the repeated transfer of relatively small amounts of catalyst at closely spaced points in time. For example, one batch per minute may be withdrawn from the bottom of the middle zone 40 and the withdrawal may take one-half minute, that is, catalyst will flow for one-half minute. If the catalyst inventory in the stacked reactor arrangement 100 is large, the catalyst bed may be considered to be continuously moving.

Because the catalyst particles may move semicontinuously as well as continuously, it is more appropriate to refer to the flow rate of catalyst particles in the process as an average flow rate, rather than an instantaneous flow rate. In the case of semicontinuous movement, the time period over which the average is computed is generally the time period from the transfer of one batch of catalyst until the transfer of the next batch, rather than the time period during which a single batch is transferred. Thus, in the example above where one batch of catalyst particles is withdrawn per minute but the duration of the withdrawal is only one-half minute, the average flow rate of catalyst particles is one batch per minute, rather than one batch per half-minute.

Accordingly, in the description that follows the symbol "Q" followed by a subscript has a number of meanings, depending on the subscript. The symbol "$Q_{AVG}$" refers to an average value of Q during the time period prior to the current time period. Also, as in the case of $MV_{AVG}$ described previously, the term "average" means any suitable value that is representative of the value which Q had during the prior time period. The preferred method of computing $Q_{AVG}$ is:

$$Q_{AVG} = W/C$$

where the symbol "W" refers to the weight of one batch and the symbol "C" refers to the time period between the starting times of withdrawal of two successive batches from the middle zone 40. The symbol "$Q_T$" refers to the target average catalyst flow rate which is desired ultimately to be achieved. The symbol "$Q_{OLD}$" refers to the value of $Q_{AVG}$ during the time period prior to the current time period. The symbol "$Q_{MAX}$" refers to the maximum or design catalyst flow rate for the catalyst transport system.

Referring now to FIGS. 1A, 1B, and 2, transfer of catalyst particles from upper zone 20 to the stacked reactor arrangement 100 takes place as follows. At the start of the control method of this invention, an integer counter, which is referred to herein by the symbol "n," is assigned the value of 0. The integer counter n can have only the values of 0 and 1 in this embodiment. The integer counter n has the value of 0 from the start of the method until catalyst particles are loaded into the lower zone 60 for the first time; thereafter the integer counter is set equal to 1, as will be described below. In the description that follows, it will be apparent to a person of ordinary skill in the art that the integer counter n is one means to ensure that the catalyst transport system is properly initialized at the start of the control method of this invention. Other indicators or flags can be used as these means, and processes that use such other means are within the scope of the present invention as set forth in the claims.

At the start of the control method, catalyst particles are typically present in the lower zone 60 at a level that is above level switch 44. Until level switch 44 senses that the level of catalyst particles in the lower zone 60 is at or below level switch 44, the controller 100 prevents catalyst particles from being transferred from the middle zone 40 to the lower zone 60. Thus, when level switch 44 senses that the level of catalyst particles in the lower zone 60 is not at or below level switch 44, several preliminary steps need to occur in order to decrease the level of catalyst particles in lower zone 60 to that of the level switch 44. Although all of these preliminary steps could conceivably be performed by an automatic controller, it is believed that it is more practical for several of these preliminary steps to be done manually by a human operator. This is because these preliminary steps are neither repetitive nor time-consuming and because the level of catalyst particles present in the lower zone 60 present at the start of the method can vary and is not predictable. Accordingly, the description that follows of these preliminary steps is written as if several of these preliminary steps are done manually.

The first preliminary step is that level switch 44 senses or reads the level of catalyst particles in the lower zone 60. If level switch 44 senses that the catalyst level is not at or below level switch 44, then, after a check is made to ensure that the integer counter n is not equal to 1, a human operator chooses or determines a value of $MV_S$, the start-up value of MV. The operator inputs the value of $MV_S$ as the setpoint, $MV_D$, of the MV controller, which is differential pressure controller 98 in FIG. 2. The controller 98 measures $MV_A$, which is the actual value of the differential pressure across the lift line 94, and then generates a signal 82 in response to the difference between the $MV_D$ and $MV_A$. Next, the signal 82 is used to regulate control or regulating valve 80, which is operably located so as to control MV. Although signal 82 may be used to regulate the regulating valve 80 directly, an indirect or cascade method of regulating the regulating valve 82 is preferred. In this cascade method, which is shown in FIG. 2, signal 82 is input as a setpoint to the regulating fluid flow controller 78. Controller 78 in turn generates a control signal 81 that is in response to the difference between the desired and actual values of the flow rate of the regulating fluid. Finally, control signal 81 regulates the position of regulating valve 80.

The sequence of preliminary steps described in the previous paragraph repeats itself as long as the catalyst level in the lower zone 60 is not at or below level switch 44. Thus, after control signal 81 regulates the position of regulating valve 80, a check is made to ensure that the integer counter n is not equal to 1. The value of n is not equal to 1 at this time because n remains 0 during all of the preliminary steps. Thus, the preliminary steps subsequently repeat themselves, first by sensing whether the catalyst level in the lower zone 60 is at or below level switch 44, and so forth, as described in the previous paragraph. In this manner, by withdrawing catalyst particles from the lower zone 60 at a start-up rate that corresponds to $MV_S$, the catalyst level in the lower zone 60 is gradually decreased to at or below the level of level switch 44.

When the catalyst level in the lower zone 60 is at or below level switch 44, the repetition of the preliminary steps stops. After a check is made to ensure that the integer counter n is not equal to 1, which it is not at this time, the timer which is part of controller 106, is reset to a time of 0, and the timer is restarted. The symbol "t" is used herein to refer to the time as measured by the timer of controller 106. The withdrawal from the middle zone 40 and the consequent addition to the lower zone 60 of a batch of catalyst particles of weight W begins. The five steps involved in cycling valves 34 and 14 in order to transfer a load of particles from the middle zone 40 to the lower zone 60 have been described previously. What is important to emphasize is that, after the timer starts, a small but finite amount of time, typically 10 to 30 seconds, elapses until the withdrawal of catalyst particles from the middle zone 40 begins. In addition, the withdrawal of weight W of particles, once started, takes a finite amount of time, typically 30 to 60 seconds, to complete. Thus, the elapsed time from the start of the timer until a weight W of catalyst particles has been transferred from the middle zone 40 to the lower zone 60 is typically 40 to 90 seconds. This elapsed time is, in other words, the duration of steps 2 and 3 of the five-step cycle. Because steps 2 and 3 are repeated in essentially the same manner from cycle to cycle, this elapsed time does not vary substantially from one cycle to the next. This elapsed time is referred to herein as the load time and is designated herein with the symbol "$T_L$." For convenience, $T_L$ may be assigned a value prior to the first cycle of the middle zone 40 and thereafter may be left unchanged for all subsequent cycles.

As the addition of catalyst particles to the lower zone 60 proceeds, another check is made to ensure that the integer counter n is not equal to 1, which at this time it is still not. Next, values for the terms $MV_O$, $Q_{AVG}$, and $MV_T$ must be initialized. As will be described below, values for these three terms are computed or assigned repeatedly and as a matter of course during later steps of the method of this invention, but at this early stage of the method those computations or assignments have not yet taken place even once. Hence, initial values for the terms $MV_O$, $Q_{AVG}$, and $MV_T$ must be chosen. Although the choice of initial values for these terms is somewhat arbitrary, certain ranges of values are preferred. The initial value for $MV_O$ is generally from zero to $MV_S$, and preferably the initial value is $MV_N$. The initial value for $Q_{AVG}$ is generally from zero to the flow rate that corresponds to $MV_S$, and preferably the initial value is zero. The initial value for $MV_T$ is generally less than or equal to $MV_{MAX}$ and preferably it is $MV_{MAX}$. Generally, however, it is not critical to the method of this invention that the choice of the initial value of $MV_T$ be exact. This is because, after initialization and at the typical values of the maximum possible rate of change of $MV_D$, the catalyst level in lower zone 60 will fall to at or below the control level sensed by level switch 44 prior to the time when $MV_D$ attains the initial value of $MV_T$. After these initial values are chosen, the integer counter n is assigned the value of 1. During the remainder of the method of this invention, the integer counter n will remain unchanged with a value of 1.

Following the initialization of the values for the terms $MV_O$, $Q_{AVG}$, and $MV_T$, the next series of steps of the method of this invention effect the increasing or decreasing of the value of $MV_D$ from the value of $MV_O$ to the value of $MV_T$. It is a important aspect of the method of this invention that the rate of changing $MV_D$ from $MV_O$ to $MV_T$ is capable of occurring at the maximum possible rate of change, which is referred to herein by the symbol "R." R is generally from 0.2 to 20 percent, and preferably from 0.2 to 1.0 percent, of $MV_{MAX}$ per minute. What the maximum possible rate of change of $MV_D$, is for any particular process unit depends on various factors that are specific to the particular process. Some of the factors that will determine R are the maximum allowable differential pressure between the lower zone 60 and the nonmechanical valve 90, the maximum allowable differential pressure across lift line 94, and the maximum allowable differential pressure between the bottom of the stacked reactor arrangement 100 and the lifting arrangement 112. These factors, in turn, depend on other factors, including the physical properties of the catalyst particles; the voidage between the catalyst particles in lines 54, 94, and 110; the physical properties of the fluid flowing between the catalyst particles in lines 54, 94, and 110; and the length and diameter of lines 54, 94, and 110. Process concerns related to the operation of the regeneration section 118 and the stacked reactor arrangement 100, such as stability of the operation, uniformity of product quality, and economics, may also affect the value of R. In short, the maximum allowable rate of change of $MV_D$ is dictated by many factors that are interrelated in a complicated manner.

In practice, the interrelationships among the many factors that affect the value of R are so complex that the preferred approach is not to estimate R on a theoretical basis for any particular process unit but instead to determine the value of R empirically by field testing the actual process unit after it has been constructed. This inability to accurately predict R prior to field testing points out the usefulness of the method of this invention. Once a process unit has been constructed and R has been determined by field testing, that value of R can be subsequently employed in the method of this invention in order to efficiently operate the process unit in the future. Thereafter, when any change in $MV_D$ is made, the method of this invention will prevent $MV_D$ from being changed too rapidly. Thus, even if changes in $Q_T$ are made rapidly, the method of this invention will ensure that the maximum allowable rate of change of $MV_D$ is not exceeded. Accordingly, the control method of this invention greatly reduces or eliminates the need for a human operator to closely monitor and attend to the process when a change in $Q_T$ is made. In the past, the method of changing $Q_T$ and $MV_D$ was inefficient in that it wasted time, decreased the profitability of the process, and even risked halting the operation of the process. By contrast, in this invention, $Q_T$ and $MV_D$ are changed in an efficient and controlled manner that maximizes the usefulness of the process.

The first step in effecting the increasing or decreasing of the value of $MV_D$ is a determination of $Q_T$. Usually, a human operator chooses the value of $Q_T$ based on the operating conditions of the multiple reaction stages of the stacked reactor arrangement 100 and of the regeneration steps of the regeneration zone 118. Once the value of $Q_T$ is chosen, a check is made to determine whether $Q_T$ is greater than $Q_{AVG}$. If $Q_T$ is greater than $Q_{AVG}$, then an increase in the catalyst flow rate is desired. Accordingly, $MV_D$ and ultimately $MV_A$ must be increased. $MV_D$ is increased from $MV_O$ to $MV_T$ at a rate R using the equation:

$$MV_D = MV_O + Rt$$

where t is the elapsed time on controller 106's timer from the time that level switch 44 sensed that the level of catalyst particles in lower zone 60 was at or below the predetermined control level. After this computation of $MV_D$, a check is made to ensure that $MV_D$ is less than $MV_T$, because one of the objectives in increasing $MV_D$ is to increase the value of $MV_D$ to the value of $MV_T$ without exceeding $MV_T$. Thus, if the computation of $MV_D$ happens to be equal to or greater than $MV_T$, then $MV_D$ is assigned the value of $MV_T$. Otherwise, $MV_D$ is allowed to keep value computed by the equation.

If, on the other hand, $Q_T$ is less than $Q_{AVG}$, then a decrease in the catalyst flow rate is desired. Accordingly, $MV_D$ and ultimately $MV_A$ must be decreased. $MV_D$ is decreased from $MV_O$ to $MV_T$ at a rate R using the equation:

$$MV_D = MV_O - Rt$$

where t is the elapsed time on controller 106's timer. Next, a check is made to ensure that $MV_D$ is greater than $MV_T$, for the reason that the goal is to decrease the value of $MV_D$ to the value of $MV_T$, but without falling below $MV_T$. Thus, if the computation of $MV_D$ is less than or equal to $MV_T$, then $MV_D$ is assigned the value of $MV_T$. Otherwise, $MV_D$ is allowed to keep value computed by the equation.

Most commonly, the maximum rate of increase of the value of $MV_D$ is the same as the maximum rate of decrease of the value of $MV_D$. This is illustrated in the two above equations in which the same value R is used to compute $MV_D$ both when $MV_D$ is being increased and when $MV_D$ is being decreased. However, it is not a necessary element of this invention that the maximum rate of increase of the value of $MV_D$ be the same as the maximum rate of decrease of the value of $MV_D$. The actual maximum rates of increase and decrease of the value of $MV_D$ are determined by the dynamics of the process to which this invention is applied, as described previously. Thus, it is possible that the dynamics of the process for increasing the value of $MV_D$ may be different from the dynamics for decreasing the value of $MV_D$. In that case, one value of R would be used in the equation to increase $MV_D$ and another value of R would be used to decrease $MV_D$.

In any event, after the value of $MV_D$ is determined, $MV_A$ is measured, and a signal is generated that is in response to the difference between $MV_D$ and $MV_A$. This signal is used to regulate the control valve that is operably located so as to affect the value of $MV_A$. After the control valve is regulated, a check is made to determine whether the integer counter n is equal to 1. Because n has the value of 1 at this time, then a check is made to determine whether the elapsed time t from the start of the cycle is less than the load time, $T_L$. If t is less than $T_L$, then the catalyst batch that was supposed to have been loaded into the lower zone 60 during the cycle whose time is being measured has not completely had sufficient time to be entirely loaded. In that case, it is not appropriate to read the level of catalyst particles in the lower zone 60, because the level is not yet indicative of the effect of adding an entire batch into lower zone 60. Moreover, if on reading the level of catalyst particles in the lower zone 60, level switch 44 sensed that the level of catalyst particles was at or below the predetermined control level, then there is a risk of adding a second batch of particles to the lower zone 60 before the effect of adding the first batch of particles had been determined. This could lead to adding one batch directly on top of another, possibly overfilling the lower zone 60.

In order to avoid overfilling lower zone 60, if the elapsed time t is less than the load time $T_L$, then, instead of reading the level in the lower zone 60, the method of this invention repeats itself to the extent that $Q_T$ is determined, $MV_D$ is increased or decreased, and the control valve that is operably located so as to control $MV_A$ is regulated. In other words, the steps of the previous four paragraphs are repeated. These steps, which basically entail either on the one hand increasing or decreasing $MV_D$ to achieve the value of $MV_T$ or on the other hand maintaining $MV_D$ at the value of $MV_T$, and in addition regulating the control valve in order that $MV_A$ attains that value of $MV_D$, are continued until the elapsed time t is equal to or greater than the load time $T_L$.

Once the elapsed time t is equal to or greater than the load time $T_L$, the method of this invention proceeds by reading the level in the lower zone 60 and then checking whether or not the level is low. If the level is not low, then because the integer counter n is 1 at this time, the cycle repeats the steps described in the previous paragraph. The reason for this is that, even though the elapsed time t is greater than the load time $T_L$, nevertheless the level in the lower zone 60 has not dropped low enough. This prevents overfilling of the lower zone 60.

If, on the other hand, the elapsed time t is equal to or greater than the load time $T_L$, and the level in the lower zone 60 is below the predetermined control level, then after a check is made to confirm that the integer counter n is 1, the timer is stopped. The elapsed time of the cycle is saved as the value C. Then, the timer is reset to 0 and restarted. Next, cycling of the middle zone 40 is begun, which over the course of a sequence ultimately leads to a batch of W particles being deposited into the lower zone 60, as described previously.

Next, values for the terms $MV_O$, $Q_{AVG}$, and $MV_T$ are determined. When no catalyst particles had yet been added to the lower zone 60 and the integer counter n was 0, values for the terms $MV_O$, $Q_{AVG}$, and $MV_T$ were determined by initialization. At this step in the method, however, one prior batch of catalyst particles has already been added to the lower zone 60, and actual data and information that were generated during the addition of that prior batch are used for determining values for the terms $MV_O$, $Q_{AVG}$, and $MV_T$. The use of the data and information collected during a prior batch or prior batches as a means to regulate the catalyst transfer rate is an essential element of this invention.

Various methods of computing values for the terms $MV_O$, $Q_{AVG}$, and $MV_T$ can be used, and the particular method of computing the values of these terms is not an essential method of this invention. A preferred method of computation proceeds first with computing values of $MV_O$ and $Q_{AVG}$, and then computing a value of $MV_T$. The computation of $MV_T$ can itself be of any of a number of forms, of which two are shown in FIGS. 1A and 1B. The choice between the two methods shown in FIGS. 1A and 1B for use in computing $MV_T$ depends on how close $Q_{AVG}$ is to $Q_T$. As will be described hereinafter, the choice is made with a view toward preventing either overshooting or undershooting the optimum value of $MV_T$. The optimum value of $MV_T$ is that value of $MV_T$ which results in both $Q_{AVG}$ and the catalyst transport rate through lift line 96 equalling $Q_T$.

The least complex and preferred method of determining $MV_O$ is to simply assign $MV_O$ the value of $MV_D$. This is shown in FIGS. 1A and 1B. By setting $MV_O$ equal to $MV_D$, the next sequence of increasing or decreasing $MV_D$ begins where the prior sequence of increasing or decreasing $MV_D$ ended. Other possible method of determining $MV_O$ may include assigning $MV_O$ a value that, although not equal to $MV_D$, is somehow derived from $MV_D$. For example, $MV_O$ could be set equal to $MV_D$, plus (or minus) either a constant step value or some fraction of $MV_D$.

The preferred method of computing $Q_{AVG}$ is, $$Q_{AVG} = W/C$$

as described previously. Another possible method of computing $Q_{AVG}$ is dividing the sum of the weight of two or more prior successive batches by the elapsed time period for transferring two or more batches. Other methods of computing $Q_{AVG}$ are possible because the term "average" can have various meanings, as mentioned previously.

As mentioned previously, there are two preferred methods of computing $MV_T$ shown in FIGS. 1A and 1B. Both methods involve a three-step computation. First, $MV_{AVG}$ is computed. Second, a parameter is computed that is referred to herein with the symbol "D" and that is indicative of how close $Q_{AVG}$ is to $Q_{OLD}$. Third, a value of $MV_T$ is computed. Although the two methods shown in FIGS. 1A and 1B use different formulas in the third step to compute $MV_T$, both methods use the same formulas to compute $MV_{AVG}$ and D.

Accordingly, the preferred method of computing $MV_T$, which is shown in FIGS. 1A and 1B, is as follows. First, $MV_{AVG}$ is computed as follows:

$$MV_{AVG} = \left[ \int_{t=0}^{t=C} MV_D dt \right] / C$$

as described previously. Next, the preferred method of computing the parameter D uses the formula:

$$D = \frac{|Q_{AVG} - Q_{OLD}|}{Q_{MAX}}$$

The particular formula that is used to compute the parameter D is not an essential element of this invention, and thus other formulas for D may be used. Although the above formula for D is preferred in part because of its simplicity, the above formula for D is also useful because the value of D that results is a direct indication of the uncertainty, or error, that propagates into the value of $MV_T$ when a preferred formula for computing $MV_T$ is used. Obviously, the above formula for D computes a value of D that is a direct indication of how close $Q_{AVG}$ is to $Q_{OLD}$, because for a given value of $Q_{MAX}$ the smaller the difference in absolute terms between $Q_{AVG}$ and $Q_{OLD}$, the smaller is the value of D. In addition, the above formula for D computes a value of D that is a direct indication of the absolute percentage uncertainty in the result of subtracting $Q_{OLD}$ from $Q_{AVG}$. The smaller the difference in absolute terms between $Q_{AVG}$ and $Q_{OLD}$, the greater is the percentage uncertainty in subtracting $Q_{OLD}$ from $Q_{AVG}$ that results from uncertainty in $Q_{AVG}$, $Q_{OLD}$, or both. Although uncertainty in $Q_{AVG}$ and $Q_{OLD}$ may arise from uncertainty in the measurement of the weight of catalyst W, it has been recognized that uncertainty in the measurement of the time period C is a more likely source of uncertainty in $Q_{AVG}$ and $Q_{OLD}$. The measurement of the time period C is itself uncertain because of the somewhat unpredictable and variable response times of level switches that are currently available commercially for use as level switch 44 in lower zone 60. Random variations in responding to the absence of a catalyst level at the location of level switch 44 in lower zone 60 introduces uncertainty into the measurement of time period C. This uncertainty propagates into the $Q_{AVG}$ and $Q_{OLD}$ and into the subtraction of $Q_{OLD}$ from $Q_{AVG}$, and thus can ultimately propagate into $MV_T$ itself.

Accordingly, if the formula for $MV_T$ involves the subtraction of $Q_{OLD}$ from $Q_{AVG}$, then the smaller the value of D, the greater is the likelihood that the next computed value of $MV_T$ will, because of the increased uncertainty, undershoot or overshoot the optimum value of $MV_T$. Thus, the smaller the value of D, the more preferred is a formula for $MV_T$ that does not involve the subtraction of $Q_{OLD}$ from $Q_{AVG}$. Similarly, the larger the value of D, the less is the likelihood that a formula for $MV_T$ that involves the subtraction of $Q_{OLD}$ from $Q_{AVG}$ will result in undershooting or overshooting the optimum value of $MV_T$. In order to decrease the likelihood of overshoot or undershoot, the embodiment of this invention shown in FIGS. 1A and 1B uses one formula for $MV_T$ when the value of D is relatively high and another formula for $MV_T$ when the value of D is relatively low.

In the embodiment of this invention shown in FIGS. 1A and 1B, a value of D of 0.05 is used as the cutoff point between when one or another formula for $MV_T$ is used. Looking first at the case where D is less than or equal to 0.05, then the preferred formula for computing $MV_T$ is:

$$MV_T = (MV_{AVG} - MV_N) \times \frac{Q_T}{Q_{AVG}} + MV_N$$

This formula represents a linear extrapolation from the value of $MV_{AVG}$ that corresponds with $Q_{AVG}$ to a new value of $MV_T$ that corresponds with $Q_T$. This formula implicitly assumes that when Q is zero, MV is $MV_N$. The applicability of this formula and the significance of this assumption can be best understood graphically in terms of a rectilinear graph in which MV is on the y-axis and Q is on the x-axis. In graphical terms, this formula in effect draws a line from the point (Q=0, MV=$MV_N$) to the point (Q=$Q_{AVG}$, MV=$MV_{AVG}$), then extends that line linearly to intersect the line Q=$Q_T$, and finally determines $MV_T$ as that value of MV at which the two lines intersect. Because this formula does not involve subtraction of $Q_{OLD}$ from $Q_{AVG}$, this formula is particularly applicable for computing $MV_T$ when D is relatively small and the likelihood of overshooting or undershooting the optimum value of $MV_T$ is relatively great. In the case where $MV_N$ is zero or negligible in the computation, this formula simplifies to:

$$MV_T = MV_{AVG} \times \frac{Q_T}{Q_{AVG}}$$

Looking next at the case where D is greater than 0.05, then the preferred formula for computing $MV_T$ is:

$$MV_T = (MV_{AVG} - MV_{OLD}) \times \frac{(Q_T - Q_{OLD})}{(Q_{AVG} - Q_{OLD})} + MV_{OLD}$$

In this formula, the symbol "$MV_{OLD}$" refers to the value of $MV_O$ that had been used for increasing or decreasing the value of $MV_D$ during the immediately preceding period. In other words, $MV_{OLD}$ is equal to the value of $MV_O$ prior to the most recent assignment to $MV_O$ of the value of $MV_D$. Similarly, the symbol "$Q_{OLD}$" refers to the value of $Q_{AVG}$ that had been used for increasing or decreasing the value of $MV_D$ during the immediately preceding period. In other words, $Q_{OLD}$ is equal to the value of $Q_{AVG}$ prior to most recent computation of $Q_{AVG}$ by dividing W by C. Like the formula for $MV_T$ when D is less than or equal to 0.05, this formula represents a linear extrapolation from the value of $MV_{AVG}$ that corresponds with $Q_{AVG}$ to a new value of $MV_T$ that corresponds with $Q_T$. But unlike the formula for $MV_T$ when D is less than or equal to 0.05, this formula does not implicitly assume that when Q is zero, MV is $MV_N$. The significance of not making this assumption can again be best understood graphically in terms of a rectilinear graph in which MV is on the y-axis and Q is on the x-axis. In graphical terms, this formula in effect draws a line from the point (Q=$Q_{OLD}$, MV=$MV_{OLD}$) to the point (Q=$Q_{AVG}$, MV=$MV_{AVG}$), then extends that line linearly to intersect the line Q=$Q_T$, and determines $MV_T$ as that value of MV at which the two lines intersect. Because this formula does involve subtraction of $Q_{OLD}$ from $Q_{AVG}$, this method of computing $MV_T$ is particularly applicable when D is relatively large and the likelihood of overshooting or undershooting the optimum value of $MV_T$ is relatively small. Also, by extrapolating through the point (Q=$Q_{AVG}$, MV=$MV_{AVG}$) from the point (Q=$Q_{OLD}$, MV=$MV_{OLD}$) rather than from the point (Q=0, MV=$MV_N$), a better estimate of $MV_T$ is obtained, especially where the entire relationship between MV and Q is not linear.

It should be appreciated by a person skilled in the art that another value of D could have been chosen as the cutoff point between where one or the other formula for $MV_T$ could be used. Likewise, more than one cutoff point for the value of D could have been used, and corresponding to each additional cutoff point an additional formula for $MV_T$ could have been used. Moreover, the formulas for $MV_T$ could have been more complex than the linear formulas presented above. For example, the formulas for $MV_T$ could have been quadratic, logarithmic, exponential, or any of a variety of nonlinear forms. In generating the formula, pairs of (MV, Q) data from more than one prior cycle could have been used. Curve-fitting algorithms are well known and data storage devices are widely available so that dozens or hundreds of pairs of (MV, Q) data could be used to produce extremely accurate linear or nonlinear formulas that represent the actual relationship between MV and Q. Thus, the scope of this invention as set forth in the claims is not limited to any particular method or formula of computing $MV_T$.

Once the value of $MV_T$ is determined, the method of this invention continues with a determination of the value of $Q_T$, followed by the increasing or decreasing of $MV_D$, as described previously.

What is claimed is:

1. A method for controlling the transport rate of particles from a source zone to a destination zone at a rate that does not exceed a maximum change rate for a particle transport system, said method comprising:

a) withdrawing particles from a source zone, and passing said particles withdrawn from said source zone through a line to a destination zone at a transport rate of said particles and measuring an actual value of an indicator that varies in relation to the transport rate of said particles from said source zone to said destination zone;

b) decreasing the actual volume of said particles in said source zone to below a control volume of said particles in said source zone by said withdrawing of said particles from said source zone;

c) when the actual volume of said particles in said source zone is below said control volume in Step (b), adding said particles to said source zone, thereby increasing the actual volume of said particles in said source zone to more than said control volume;

d) after adding said particles to said source zone in Step (c), allowing the actual volume of said particles in said source zone to decrease below said control volume by said withdrawing of said particles from said source zone;

e) determining a first average value of said indicator during a first time period from the time when the actual volume of said particles in said source zone decreased below said control volume of said particles in said source zone in Step (b) until the time when the actual volume of said particles in said source zone decreased below said control volume of said particles in said source zone in Step (d);

f) determining a first average addition rate of said particles to said source zone during said first time period by dividing the amount of particles added to said source zone in Step (c) by said first time period;

g) establishing a first final value of said indicator as a function of a target addition rate of said particles, said first average addition rate of said particles, and said first average value of said indicator;

h) increasing or decreasing a desired value of said indicator at a change rate that does not exceed said maximum change rate of said indicator;

i) comparing said desired value of said indicator after said increasing or decreasing with the actual value of said indicator and updating a control signal in response to the difference between said desired value after said increasing or decreasing and said actual value to generate an updated control signal;

j) employing said updated control signal to actuate a means to control said transport rate of said particles from said source zone to said destination zone; and k) repeating Steps (h), (i), and (j) until said desired value equals said first final value of said indicator.

2. The method of claim 1 further characterized in that said particles withdrawn from said source zone are passed to a lifting zone, a transport stream comprising a fluid is passed to said lifting zone, said particles and said fluid are withdrawn from said lifting zone to said line, said fluid passes through said line to said destination zone, and said indicator is the pressure difference between said source zone and said destination zone.

3. The method of claim 2 further characterized in that said means to control comprises a valve operably located so as to control the flow of said transport stream to said lifting zone.

4. The method of claim 1 where said maximum change rate is 1 percent of the maximum value of said indicator per minute.

5. The method of claim 1 wherein in Step (e) said first average value of said indicator is computed by integrating said desired value of said indicator over said first time period to obtain a result and dividing said result by said first time period.

6. The method of claim 1 wherein after Step (k) of claim 1 said method further comprises:

a) decreasing the actual volume of said particles in said source zone to below said control volume of said particles in said source zone by said withdrawing of said particles from said source zone;

b) when the actual volume of said particles in said source zone is below said control volume in Step (a), adding said particles to said source zone, thereby increasing the actual volume of said particles in said source zone to more than said control volume;

c) after adding said particles to said source zone in Step (b), allowing the actual volume of said particles in said source zone to decrease below said control volume by said withdrawing of said particles from said source zone;

d) determining a second average value of said indicator during a second time period from the time when the actual volume of said particles in said source zone decreased below said control volume of said particles in said source zone in Step (a) until the time when the actual volume of said particles in said source zone decreased below said control volume of said particles in said source zone in Step (c);

e) determining a second average addition rate to said source zone during said second time period by dividing the amount of particles added to said source zone in Step (b) by said second time period;

f) computing a second final value of said indicator using the formula:

$$MV_T = (MV_{AVG} - MV_{OLD}) \times \frac{(Q_T - Q_{OLD})}{(Q_{AVG} - Q_{OLD})} + MV_{OLD}$$

wherein
$MV_T$=second final value of said indicator,
$MV_{AVG}$=second average value of said indicator,
$MV_{OLD}$=first final value of said indicator,
$Q_T$=target addition rate,
$Q_{OLD}$=first average addition rate, and
$Q_{AVG}$=second average addition rate;

g) increasing or decreasing said desired value of said indicator at a change rate that does not exceed said maximum change rate of said indicator;

h) comparing said desired value of said indicator after said increasing or decreasing with the actual value of said indicator and updating a control signal in response to the difference between said desired value after said increasing or decreasing and said actual value to generate an updated control signal;

i) employing said updated control signal to actuate a means to control said transport rate of said particles from said source zone to said destination zone; and j) repeating Steps (g), (h), and (i) until said desired value equals said second final value of said indicator.

7. The method of claim 1 wherein in Step (g) said first final value of said indicator is computed using the formula:

$$MV_T = (MV_{AVG} - MV_N) \times \frac{Q_T}{Q_{AVG}} + MV_N$$

wherein
$MV_T$=first final value of said indicator,
$MV_{AVG}$=first average value of said indicator,
$MV_N$=actual value of said indicator when the transport rate of said particles from said source zone to said destination zone is zero,
$Q_T$=target addition rate, and
$Q_{AVG}$=first average addition rate.

8. A hydrocarbon conversion process for contacting a hydrocarbon-containing feedstream with a particulate catalyst at hydrocarbon conversion conditions in a reaction zone, deactivating said catalyst in said reaction zone, passing said catalyst from a first bottom location in said reaction zone and to a first top location in a regeneration zone, reactivating said catalyst in said regeneration zone, and passing said catalyst from a second bottom location in said regeneration zone to a second top location in said reaction zone, said process comprising controlling the transport rate of said catalyst from said second bottom location to said second top location at a rate that does not exceed a maximum change rate for said hydrocarbon conversion process, said method comprising:

a) passing said catalyst downwardly from said second bottom location to a surge zone;

b) passing said catalyst downwardly from said surge zone to a fluid-controlled valve;

c) regulating the flow of a fluid to said fluid-controlled valve to deliver said catalyst to a lift conduit;

d) conveying said catalyst upwardly through said lift conduit with said fluid and discharging said catalyst to said second top location at a transport rate of said catalyst and measuring an actual value of the pressure difference across at least a portion of said lift conduit;

e) decreasing the actual volume of said catalyst in said surge zone to below a control volume of said catalyst in said surge zone by said passing of said catalyst from said surge zone;

f) when the actual volume of said catalyst in said surge zone is below said control volume in Step (e), adding said catalyst to said surge zone, thereby increasing the actual volume of said catalyst in said surge zone to more than said control volume;

g) after adding said catalyst to said surge zone in Step (f), allowing the actual volume of said catalyst in said surge zone to decrease below said control volume by said passing of said catalyst from said surge zone;

h) determining a first average value of said pressure difference during a first time period from the time when the actual volume of said catalyst in said surge zone decreased below said control volume of said catalyst in said surge zone in Step (e) until the time when the actual volume of said catalyst in said surge zone decreased below said control volume of said catalyst in said surge zone in Step (g);

i) determining a first average addition rate of said catalyst to said surge zone during said first time period by dividing the amount of catalyst added to said surge zone in Step (f) by said first time period;

j) establishing a first final value of said pressure difference as a function of a target addition rate of said catalyst, said first average addition rate of said catalyst, and said first average value of said pressure difference;

k) increasing or decreasing said desired value of said pressure difference at a change rate that does not exceed 20 percent of the maximum value of said pressure difference per minute;

l) comparing said desired value of said pressure difference after said increasing or decreasing with the actual value of said pressure difference and updating a control signal in response to the difference between said desired value after said increasing or decreasing and said actual value to generate an updated control signal;

m) employing said updated control signal to actuate a valve operably located so as to control the flow of said transport stream to said fluid-controlled valve; and n) repeating Steps (k), (l), and (m) until said desired value equals said first final value of said pressure difference.

9. The process of claim 8 wherein said change rate does not exceed 1 percent of the maximum value of said pressure difference per minute.

10. The process of claim 8 wherein said hydrocarbon conversion process is reforming.

* * * * *